United States Patent [19]

Rosner

[11] Patent Number: 4,561,309

[45] Date of Patent: Dec. 31, 1985

[54] METHOD AND APPARATUS FOR DETERMINING PRESSURE DIFFERENTIALS

[76] Inventor: Stanley S. Rosner, 320 Whitestone Rd., Charlotte, N.C. 28211

[21] Appl. No.: 628,754

[22] Filed: Jul. 9, 1984

[51] Int. Cl.⁴ .................................... G01L 13/06
[52] U.S. Cl. ................................ 73/705; 34/51; 73/861.75; 250/231 P
[58] Field of Search ............... 73/861.75, 861.74, 705, 73/861.71, 700, 861.76; 250/231 P; 34/51, 54

[56] References Cited

U.S. PATENT DOCUMENTS

| | | | |
|---|---|---|---|
| 2,072,369 | 3/1937 | Jenson | 73/861.75 |
| 2,746,168 | 5/1956 | Rickabaugh | 34/51 |
| 3,354,716 | 11/1967 | Wiebe et al. | 73/726 |
| 4,022,061 | 5/1977 | Schendel | 73/861.75 |
| 4,197,657 | 4/1980 | Leino et al. | 34/51 |
| 4,206,644 | 6/1980 | Platt | 250/231 P |
| 4,439,930 | 4/1984 | McMahon, Jr. | 34/54 |

*Primary Examiner*—Donald O. Woodiel
*Attorney, Agent, or Firm*—Shefte, Pinckney & Sawyer

[57] ABSTRACT

A method and apparatus for sensing a pressure differential between two spaces or areas, including a U-shaped length of hollow tubing having an inlet end and an outlet end which permits the free flow of air through the tubing from the higher pressure area to the lower pressure area. A vane element is pivotably mounted on the intermediate portion of the tubing and disposed in the path of an air flow therethrough, whereby the vane element moves in response to the quantity of air flow through the tubing. A photoelectric cell arrangement is provided to sense the movement of the vane element, and to generate a signal which is a function of such movement. This generated signal may be transmitted to a computer, which may then be utilized to control the air flow into or out of one of the two areas to maintain a predetermined desired pressure differential therebetween.

21 Claims, 6 Drawing Figures

METHOD AND APPARATUS FOR DETERMINING PRESSURE DIFFERENTIALS

BACKGROUND OF THE INVENTION

This invention relates generally to apparatus and a method for determining pressure differentials, such as the pressure differential between contiguous areas or zones where one is deliberately maintained at a higher or lower pressure than the other.

One typical example of an application where pressure differentials between contiguous zones must be maintained is in the textile field, and more particularly drying ovens for cloth. In apparatus of this type, a length of cloth is continuously passed through a generally enclosed zone or area having a plurality of burners disposed above and below the running length of cloth to generate heat that dries the cloth. In the process of drying the cloth, volatiles and toxic gases are generated which would be harmful to opertors or personnel in the surrounding area, and these volatiles and gases must be removed from the confines of the oven, usually by an exhaust blower. Because the drying oven, while being generally enclosed, must have some openings therein, such as openings that permit the running length of cloth to be introduced into and removed from the the oven, a danger exists that the aforesaid harmful gases may leak out of the oven and into the surrounding area, and, to avoid this danger, it is common practice to operate the exhaust blower at a high capacity that will insure that a decidedly negative pressure is maintained within the confines of the oven so that any air movement through the openings in the oven will always be inwardly from the outside surrounding area rather than vice versa. Moreover, because it is critical that the harmful gases not be permitted to escape from the oven, and because the pressure differential between the confines of the oven and the surrounding ambient zones will vary over a range, the exhaust blower is normally operated at a capacity that is substantially above that which is actually required to maintain the required negative pressure within the oven. While this arrangement generally solves the problems of harmful gases leaking out of the oven, it has practical drawbacks in that a large capacity exhaust blower is required and the operating costs of the blower are relatively high because of the high speed at which it is operated. In most instances the exhaust blower is operated at a constant speed that provides the aforesaid overcompensating capacity for air and gas removal, but it is known, in some instances, to regulate the speed of the blower in response to the moisture content of the air or the volume of air being removed from the oven.

On the other hand, it is sometimes necessary to maintain the pressure of one area or zone at a higher level that a contiguous area which is at atmospheric pressure to insure that any air flow will always be a direction toward the ambient area. For example, in hospital operating rooms, it is essential that antiseptic conditions be maintained within the confines of the operating room and that air in surrounding or adjacent rooms, which may contain germs or other contaminants, not be permitted to pass into the operating room through door openings, vents or other apertures in the walls. Accordingly, it is common practice to provide an inlet blower or other sources of pressurized air that constantly introduces pressurized air into the operting room to maintain it at a higher pressure than surrounding or continuous areas so that any air flow through the aforesaid wall openings or apertures will be in a direction from, rather than into, the operating room. Again, it is common practice to use an inlet blower that has a higher capacity than is actually needed, and to operate such blower at a generally constant high operating speed that is sufficient to overcompensate for the actual needs of maintaining a positive relative pressure within the operating room under all conditions, all of which increases the initial and operating costs of such installation.

In accordance with the present invention, an arrangement is provided for accurately determining the pressure differential between two areas, whereby such pressure differential can be maintained within close tolerances without requiring any significant overcompensation, and this arrangement is relatively simple and inexpensive, yet quite reliable.

SUMMARY OF THE INVENTION

The method and apparatus of the present invention includes an arrangement that has a conduit extending between two areas, one of which has a higher pressure than the other, so that air may freely flow through the conduit from the higher pressure area to the other area. A movable member is provided in the conduit so that air flow through the conduit will cause movement of such member, the extent of this movement being determined by the quantity of air flow through the conduit. A sensor is provided to sense the extent of movement of the movable member, and to generate a signal which is proportional thereto.

In the preferred embodiment of the present invention, the conduit includes a generally cylindrical portion in which a vane member is mounted for pivotal movement about a pivot axis extending across the conduit in a direction transverse to the direction of air flow, such vane member being generally flat with a semi-circular shape to conform to the dimensions of the conduit and having a flat, trapezoidal-shaped projecting portion extending perpendicularly from the semi-circular surface portion. A photoelectric cell device is mounted in the conduit to direct a beam there across so that the projecting portion of the vane member is in the path of such beam, and interrupts it, when the vane member is at a vertical disposition indicating no air movement through the conduit, and so that such projecting portion moves out of the path of the beam during pivotal movement of the vane member in response to air movement through the conduit. The conduit is preferably formed with an air inlet portion and an outlet portion disposed at the opposite ends of the cylindrical portion containing the vane member and photocell arrangement, such inlet and outlet portions being joined to the intermediate cylindrical portion by curved connecting portions formed to prevent any external light from being transmitted from the inlet and outlet portions to the photocell arrangement in the intermediate portion.

The pressure differential sensing arrangement may be used in conjunction with a control system that receives the signal generated by the photocell, and then regulates a blower or other means for establishing or maintaining a predetermined pressure differential between the two areas by varying the pressure in at least one of them.

DESCRIPTION OF THE PREFERRED EMBODIMENT

Figure 1:
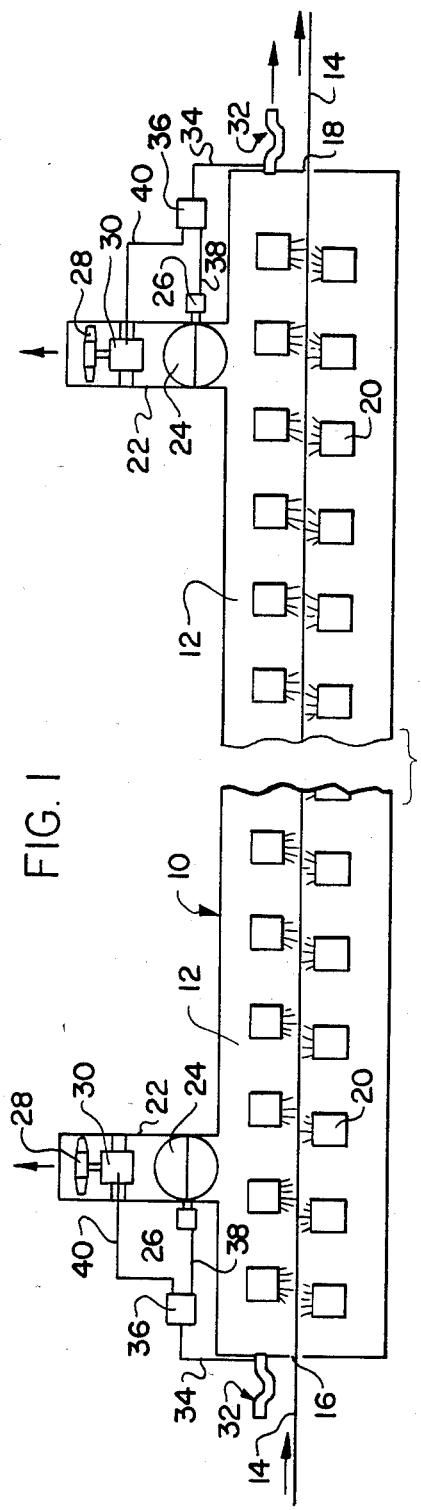
FIG. 1 is a diagrammatic illustration of a typical application for the present invention.

Looking now in greater detail at the accompanying drawings, FIG. 1 illustrates, in diagrammatic form, a textile drying oven 10 of the type described generally above which includes a substantially enclosed chamber 12 through which a continuous length of textile cloth 14 moves from one end thereof to the other, such cloth being introduced into the chamber 12 at an inlet opening 16 and leaving the chamber 12 through an outlet opening 18. The cloth 14 is moved through the chamber in a horizontal disposition and at a relatively high rate of speed, and a plurality of nozzles 20, associated with burners and fans (not shown), are disposed above and below the running length of the cloth 14 to generate heated gas flow used to dry the cloth 14. Two exhaust ducts 22 are disposed, respectively, at the ends of the oven 10, and a rotatable flow control baffle 24 is mounted in each exhaust duct 22, the position of the flow control baffle being regulated by a motor 26 to position the baffle 24 at any desired position to thereby selectively vary the air flow through the exhaust duct 22. Additionally, an exhaust blower 28 having a variable speed motor 30 is shown mounted in each exhaust duct to draw air outwardly from the chamber 12 through the exhaust ducts 22. In typical textile drying ovens, either the baffle plate 24 or the exhaust blower 28 can be regulated, but not both. In the drawings, both are shown as being capable of being regulated since the present invention allows either to be regulated as described in greater detail below. As described above, in typical textile drying oven operations, the position of the control baffles 24 or the speed of the motors 30 for the exhaust blower 28 are pre-set to insure that a sufficient quantity of air is withdrawn from the chamber 12 to create a significant negative pressure therein relative to the surrounding or ambient area so that any air flow through the inlet and outlet openings 16 and 18, or any other openings within the chamber 12, will always be in a direction from the outside or surrounding area into the chamber 12 to prevent volatiles or harmful gases from leaking out into the surrounding area through any such openings.

As shown in FIG. 1, a pressure differential sensing device 32, which is illustrated in greater detail in FIGS. 2-5, is arranged at or adjacent the inlet and outlet openings 16 and 18 with one end of each pressure differential sensing device being disposed to communicate with the interior of the enclosed chamber 12 and with the other end being disposed outwardly of such chamber 12 in the surrounding area. As will be explained in greater detail presently, electrical lines 34 extend from the sensing devices 32 to a computer 36 which, in turn, has electrical lines 38 which extend to the control motor 26 for the baffle 24 and electrical lines 40 which extend to the variable speed motor 30 of the exhaust blower 28.

Figure 5:
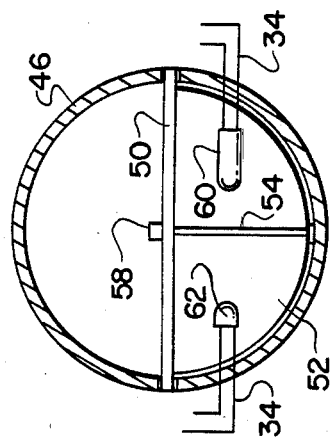
FIG. 5 is a section view taken along reference plane 5—5 in FIG. 2.
Figure 2:
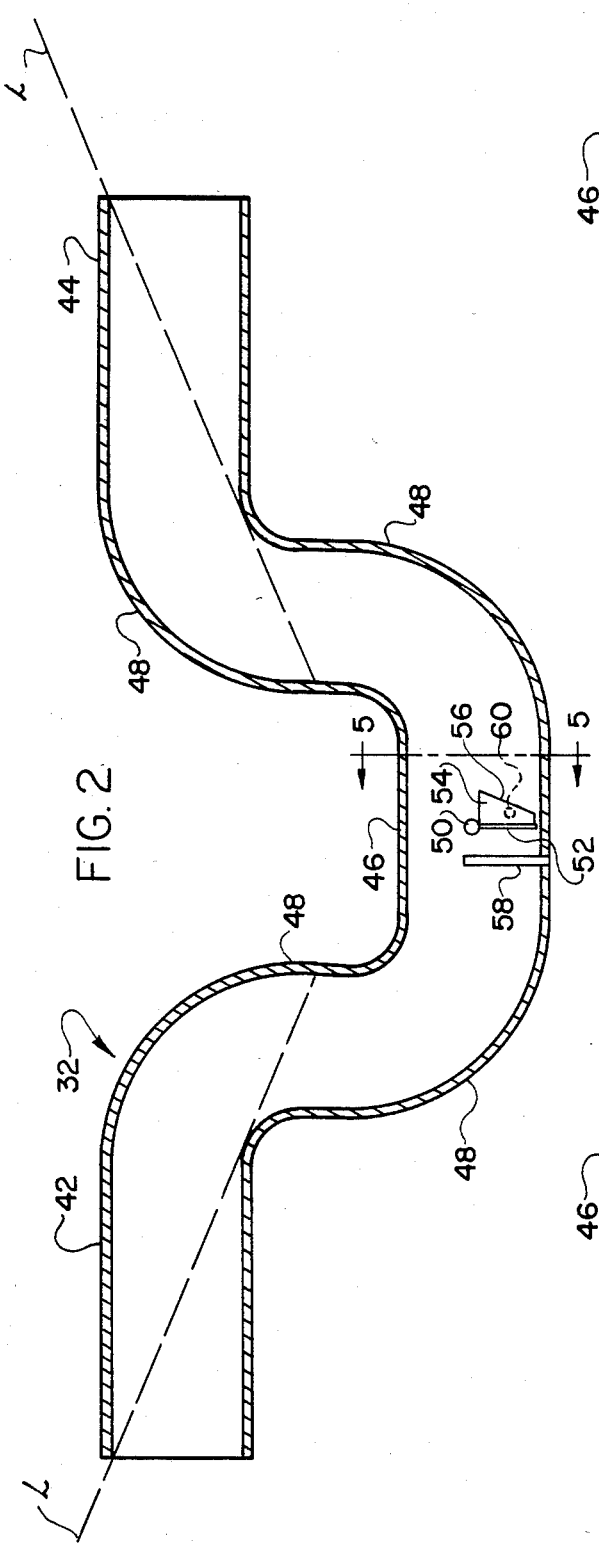
FIG. 2 is a side elevational view, in section, of the pressure differential sensing device embodying the present invention.
Figure 4:
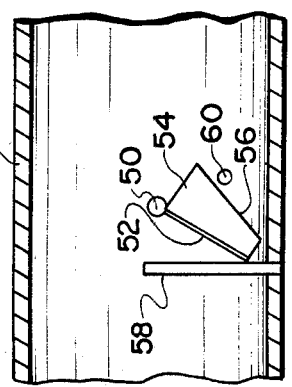
FIG. 4 is a detail view similar to FIG. 3 and showing the vane member at another operating position.
Figure 3:
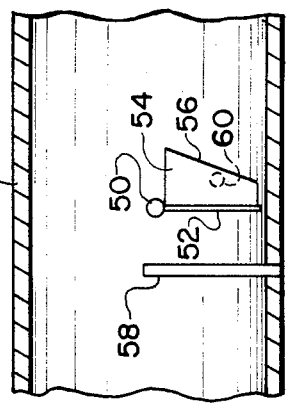
FIG. 3 is a detail view illustrating a portion of the device shown in FIG. 2, with the vane member at one of its operating positions.

The pressure differential sensing device 32 includes a length of hollow cylindrical tubing formed into a U-shaped configuration, with each of the ends being open and with the tubing being hollow throughout to permit the free and unencumbered flow of air therethrough. As best seen in FIG. 2, the tubing includes a first generally straight end portion 42, a second generally straight end portion 44, and an intermediate straight portion 46 connected to the end portions 42 and 44 by curved portions 48. Within the intermediate portion 46, a pivot shaft 50 extends across the interior of the tubing and is fixed in the side walls of the tubing (see FIG. 5), this pivot shaft extending substantially diametrically across the cylindrical tubing in a direction transverse to the flow of air through the tubing. A vane element 52 is mounted on the pivot shaft and depends downwardly therefrom, such vane element having a semi-circular shape corresponding generally to the interior dimensions of the hollow tubing but with a slight clearance with respect to the interior wall of the tubing as shown in FIG. 5 so that the vane element 52 occupies essentially one-half of the cross-sectional area of the tubing and is freely pivotable about the pivot shaft 50. The vane element 52 includes a generally flat projecting portion 54 having a trapezoidal shape with the extending edge 56 thereof defining a gradually decreasing projecting thickness from the vane element 52, as illustrated in FIGS. 3 and 4. A rod member 58 is secured in the bottom of the hollow tubing and extends upwardly therefrom on one side of the pivot shaft 50 to provide a stop for the pivotal vane element 52 in one direction of movement thereof, as illustrated in FIG. 4. A conventional photocell arrangement consisting of a light beam generator 60 and a receiver 62 are mounted in the intermediate portion 46 of the hollow tubing and disposed so that the beam of light transmitted by the generator 60 will be interrupted completely by the presence of the vane projection 54 when the vane element 54 is in its vertical position (see FIG. 3), and so that the beam of light is uninterrupted when the vane element 54 is pivoted a predetermined amount from its vertical position, as shown in FIG. 4. It will also be appreciated that the outer edge 56 of the vane projection 54 will gradually permit more of the light beam to become uninterrupted as the vane element 54 moves from its vertical disposition to its pivoted disposition.

In operation, the pressure differential sensing device 32 is mounted in a wall or partition separating two areas or zones, one of which has a higher pressure than the other, such as the end walls of the enclosed chamber 12 of a textile drying oven 10 as shown in FIG. 1, with the first end portion 42 being disposed in the area having the lower relative pressure and with the second end portion 44 being disposed in the area having the relatively higher pressure. This difference in pressure between the two areas will cause air or gases to flow through the pressure sensing device 32 in a direction from the high pressure area to the low pressure area, and this air movement will cause pivotal movement of the vane member 52 which extends across the path of such air flow. The vane element 52 is preferably made of light weight material and is freely pivotally mounted on the pivot shaft 50 so that even the slightest flow of air will cause pivotal movement of the vane element 52, and the degree of such pivotal movement is determined by the quantity of the air flow through the hollow tubing. Any such pivotal movement of the vane element 52 is sensed by the photocell arrangement 60 and 62 by virtue of the fact that the light beam generated thereby becoming gradually uninterrupted as the vane element 52 pivots from its vertical disposition. The photocell arrangement 60,62 is therefore able to generate a signal proportional to the extent of movement of the vane element 52, and this signal is transmitted through electrical lines 34 to a conventional computer 36. Preferably, the computer is programmed to receive the signal from the photoelectric cell arrangement 60,62 at selected intervals (e.g. every 3 seconds) and to transmit a control signal to the variable speed motor 30 of the exhaust blower 28 through electrical line 40, or to transmit a control signal to the control motor 26 of the flow control baffle 24 through electrical line 38. The computer 36 is programmed to regulate the position of the flow control baffle 24 or the operating speed of the exhaust blower 22 in a predetermined manner, depending on the signal received from the photocell arrangement 60,62. It will be appreciated that the computer 36 can be programmed to provide an infinite variety of control parameters, depending on the requirements of the particular application.

As discussed above, it is essential that the pressure within the confines of the enclosed chamber 12 of the textile drying oven be maintained at a negative pressure, with respect to the surrounding or ambient area, so that volatile and other harmful gases cannot leak into such surrounding or ambient areas through any openings in the chamber 12. Accordingly, in this application of the present invention, the desired negative pressure in the chamber 12 will cause a flow of air inwardly through the pressure differential sensing device 32, and this flow of air will cause the vane element 52 to be pivoted about its pivot axis. If the sensed quantity of air flow is appropriate in connection with the desired negative pressure within the chamber 12, the pivoted disposition of the vane element 52 will be sensed by the photocell arrangement 60,62 and no control function will be transmitted to the baffle 24 or the exhaust blower 28. If, however, the pressure differential is less than desired, there will be a lesser flow of air through the sensing device 32 which will result in the vane element 52 returning, by gravity, towards its vertical disposition, and this movement will be sensed by the photoelectric cell arrangement 60,62 and transmitted to the computer 36 which, in turn, will generate control signals to open the baffle 24 and/or increase the speed of the exhaust blower 28 to thereby create a greater vacuum within the chamber 12 and re-establish the desired pressure differential.

As seen in FIG. 2, the U-shaped configuration of the hollow tubing of the sensing device 32 prevents any external light from passing through the end portions 42,44 and reaching the photoelectric cell arrangement 60,62 to adversely effect its operation. Reference lines L in FIG. 2 represent the sharpest angle that a beam of external light can pass through the tubing end portions 42,44, and it will be noted that these beams cannot reach the intermediate tubing portion 46 where the photoelectric cell arrangement 60,62 is located. Preferably, the entire interior surface of the hollow tubing is blackened or otherwise prepared so that it will not reflect any light, and therefore there will be virtually no undesirable reflection of any light beams L that may pass into the hollow tubing.

Figure 6:
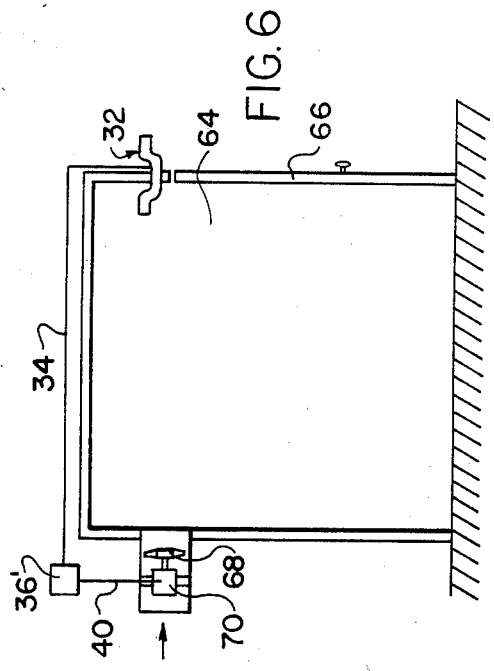
FIG. 6 is a diagrammatic view illustrating another typical application for the present invention.

FIG. 6 illustrates a further application of the present invention, wherein it is desired to maintain the pressure within a confined space at a higher pressure than the surrounding or ambient area. FIG. 6 is a diagrammatic illustration of a room 64, such as a hospital operating room, having an entrance door 66, and an inlet blower 68 operated by a variable speed motor 70 is provided for generating a flow of air into the room 64 to maintain the pressure therein at an elevated level. In this application, the pressure sensing device 32 is disposed in one of the walls of the room 64 with the second end portion 44 of the sensing device 32 extending into the room 64 and the first end portion 42 of the sensing device 32 being disposed outwardly of the room in an area at atmospheric pressure. The pressure differential between the room 64 and the surrounding area will cause air to flow outwardly from the room through the pressure differential sensing device 32, and such air flow will be sensed in the manner set forth above, and a signal will be generated and transmitted to a computer 36' which is programmed to control the variable speed motor 70 in the same general manner as that discussed above so as to maintain the desired pressure differential between the confines of the room 64 and its surrounding rooms or areas.

Thus, the present invention provides a relatively simple and inexpensive, yet very reliable, arrangement for accurately sensing the pressure differential between two areas, and the sensed pressure differential may be readily used to maintain a desired pressure differential within close tolerances. The particular arrangement of the vane element 52 renders it extremely sensitive to even the most minute air flow, and the present invention is therefore considerably more sensitive to pressure changes than any known device for sensing a pressure differential. Accordingly, the significant expenses heretofore required to provide blowers having larger than necessary capacities, and operating such blowers at higher operating speeds than necessary, can be substantially reduced by utilization of the present invention where any variation in the desired pressure differential is sensed within close tolerances and a signal is generated which can be used to immediately correct any imbalance in the desired pressure differential, whereby smaller blowers can be used and operated at lower operating speeds since it is not necessary to substantially overcompensate for variations in the pressure differential because of the immediate and accurate response of the present invention to any pressure differential variations.

Also, in the application of the present invention in textile drying ovens, significant additional cost savings are realized by virtue of the fact that a more closely controlled pressure differential within the oven results in less unnecessary heated air being exhausted from the oven, and thereby wasted, as is the case where an overcompensating pressure differential is required. Finally, in these applications, the closely controlled pressure differential obtained from the present invention results in less ambient air being sucked into the oven through the cloth inlet and outlet openings, and therefore the cloth is not exposed to cooler air adjacent these openings so that a more even and rapid drying effect is obtained throughout the length of the cloth within the oven.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. Apparatus for determining a pressure differential between first and second areas in which the pressure in one said area is higher than the other, said apparatus comprising:
   (a) conduit means extending between said first and second areas to permit the free flow of air therethrough from said area having the higher pressure to the other said area, said conduit means being hollow and having a predetermined cross-sectional shape.
   (b) pivot means mounted in said hollow conduit means to extend transversely thereacross with respect to said flow of air therethrough, and a movable vane element mounted on said pivot means to depend freely therefrom in the path of said air flow for pivotal movement determined by the quantity of said air flow, said movable vane element having a shape corresponding to the shape of said conduit means beneath said pivot means except for a small clearance between the edges of said vane element and said conduit; and
   (c) sensing means for sensing the extent of said pivotal movement of said vane element and for generating a signal which is a function of said sensed movement of said movable means.

2. Apparatus for determining a pressure differential as defined in claim 1 and further characterized in that said conduit means includes an inlet portion having an open end for location within said area having the higher pressure, an outlet portion having an open end for location within said other area, and an intermediate portion between said inlet and outlet portions and connected thereto by curved connecting proportions formed to prevent any light being transmitted to said intermediate portion from said open ends of said inlet and outlet portions, and in that said sensing means includes photoelectric cell means disposed within said intermediate portion of said conduit means for sensing movement of said movable means.

3. Apparatus for determining a pressure differential as defined in claim 1 and further characterized in that said conduit means includes a cylindrical portion, in that a pivot means is mounted in said cylindrical portion to extend horizontally across the diameter of the cross-section of said cylindrical portion, and in that said vane element includes a flat semi-circular portion connected to and depending from said pivot shaft.

4. Apparatus for determining a pressure differential as defined in claim 3 and further characterized in that said vane element includes a flat projection portion extending outwardly from said flat semi-circular portion of said vane element in generally perpendicular relation thereto and in radial relation to said cross-section of said conduit means.

5. Apparatus for determining a pressure differential as defined in claim 4 and further characterized in that said flat projecting portion of said vane element has a trapezoidal shape with the extending edge thereof defining a gradually decreasing projecting thickness from said flat projecting portion along said radial extent thereof in a direction away from said pivot shaft.

6. Apparatus for determining a pressure differential as defined in claim 4 and further characterized in that said sensing means includes photoelectric cell means mounted in said conduit means to direct a beam generally diametrically thereacross, said flat projecting portion of said vane element being disposed for movement into and out of said beam during said movement of said vane member.

7. Apparatus for determining a pressure differential between first and second areas in which the pressure in one said area is higher than the other, said apparatus comprising:
   (a) cylindrically-shaped conduit means having an inlet end portion having an open end adapted to be disposed within said area having said higher pressure, an outlet end portion having an open end adapted to be disposed within said other area, and an intermediate portion between said inlet and outlet end portions and connected thereto by curved connecting portions formed to prevent any light being transmitted to said intermediate portion from said open ends of said inlet and outlet portions, said conduit means being open along the length thereof to permit the free flow of air therethrough from said area having the higher pressure to said other area;
   (b) a flat semi-circular vane element mounted for movement in said intermediate conduit portion on a pivot shaft extending diametrically and horizontally across said intermediate conduit portion so that vane element depends from said pivot shaft to normally occupy the area between said pivot shaft and the lower half of said intermediate conduit portion, and a projecting portion extending outwardly from said flat semi-circular vane element in a plane that is perpendicular to the plane of said flat semi-circular vane element and that is radial with respect to said cylindrical intermediate conduit portion; and
   (c) sensing means disposed in said intermediate conduit portion, said sensing means including photoelectric cell means for directing a beam generally diametrically across said intermediate conduit portion, said projecting portion of said vane element being disposed for movement into and out of said beam during said movement of said vane element, and including means for generating a signal which is a function of said movement of said vane element.

8. Apparatus for maintaning a predetermined pressure differential between first and second areas in which the pressure in one such area is higher than the other, said apparatus comprising:
   (a) wall means separating said first and second areas;
   (b) conduit means extending between said first and second areas with one end thereof opening into said first area and the other end thereof opening into said second area, said conduit means permitting the free flow of air therethrough from said area having the higher pressure to said other area;
   (c) movable means mounted in said conduit and in the path of said air flow for movement caused by said air flow, the extent of said movement being a function of quantity of the air flow through said conduit means;
   (d) sensing means for sensing the extent of said movement of said movable means and for generating a signal proportional to the extent of said movement; and (e) control means receiving said generated signal and maintaining a predetermined pressure differential between said first and second areas by varying the pressure in at least one of said areas.

9. Apparatus for maintaining a predetermined pressure differential as defined in claim 8 and further characterized in that said control means includes exhaust blower means for removing air from said other area, and in that the quantity of air removed by said exhaust blower is varied in response to said signal received from said sensing means to maintain said predetermined pressure differential between said first and second areas.

10. Apparatus for maintaining a predetermined pressure differential as defined in claim 8 and further characterized in that said control means includes a selectively movable damper means disposed in an exhaust conduit extending from said other area to control the quantity of air exhausted therefrom, and in that the position of said damper means is varied in response to said signal received from said sensing means to maintain said predetermined pressure differential between said first and second areas.

11. Apparatus for maintaining a predetermined pressure differential as defined in claim 8 and further characterized in that said control means includes a blower for introducing pressurized air into said area having the higher pressure, and in that the quantity of air introduced by said blower is varied in response to said signal received from said sensing means to maintain said predetermined pressure differential between said first and second areas.

12. Apparatus for maintaining a predetermined pressure differential as defined in claim 8 and further characterized in that said movable means includes a vane element mounted in said conduit for pivotal movement about an axis extending transversely to said flow of air through said conduit means.

13. Apparatus for maintaining a predetermined pressure differential as defined in claim 12 and further characterized in that said conduit means includes a cylindrical portion, in that a pivot shaft is mounted in said cylindrical portion to extend horizontally across the diameter of the cross-section of said cylindrical portion, and in that said vane element includes a flat semi-circular portion connected to and depending from said pivot shaft.

14. Apparatus for maintaining a predetermined pressure differential as defined in claim 13 and further characterized in that said vane element includes a flat projection portion extending outwardly from said flat semi-circular portion of said vane element in generally perpendicular relation thereto and in radial relation to said cross-section of said conduit means.

15. Apparatus for maintaining a predetermined pressure differential as defined in claim 14 and further characterized in that said flat projecting portion of said vane element has a trapezoidal shape with the extending edge thereof defining a gradually decreasing projecting thickness from said flat projecting portion along said radial extent thereof in a direction away from said pivot shaft.

16. Apparatus for maintaining a predetermined pressure differential as defined in claim 14 and further characterized in that said sensing means includes photoelectric cell means mounted in said conduit means to direct a beam generally diametrically thereacross, said flat projecting portion of said vane element being disposed for movement into and out of said beam during said movement of said vane member.

17. Apparatus for maintaining a predetermined pressure differential as defined in claim 8 and further characterized in that said conduit means includes an inlet portion having an open end for location within said area having the higher pressure, an outlet portion having an open end for location within said other area, and an intermediate portion between said inlet and outlet portions and connected thereto by curved connecting proportions formed to prevent any light being transmitted to said intermediate portion from said open ends of said inlet and outlet portions, and in that said sensing means includes photoelectric cell means disposed within said intermediate portion of said conduit means for sensing movement of said movable means.

18. A method of maintaining a predetermined pressure differential between first and second area in which the pressure in one said area is higher than the other, said method comprising the steps of:

(a) establishing a flow path for air to flow freely from said one area to said other area as a result of the pressure differential therebetween;

(b) sensing the quantity of air flowing along said flow path;

(c) generating an electrical signal that is a function of said sensed quantity of said air flow;

(d) utilizing said generated electrical signal for automatically regulating the pressure in at least one of said one areas or said other area in response to said sensed quantity of air flow to maintain the pressure differential between said one area and said other area at a predetermined level.

19. A method of maintaining a predetermined pressure differential as defined in claim 18 and further characterized by the step of disposing a movable element directly in said flow path for movement by said air flowing along said flow path, the extent of said movement being in proportion to the quantity of air flowing along said flow path, and in that said extent of said movement of said movable element is sensed to determine the quantity of said air flowing along said flow path.

20. A method of maintaining a predetermined pressure differential as defined in claim 18 and further characterized in that said pressure in said one area is increased and decreased in response to said sensed quantity of air flow, and in that said pressure in said other area is atmospheric pressure.

21. A method of maintaining a predetermined pressure differential as defined in claim 18 and further characterized in that said pressure in said other area is increased and decreased in response to said sensed quantity of air flow, and in that said pressure in said one area is atmospheric pressure.

* * * * *